Figure 1:
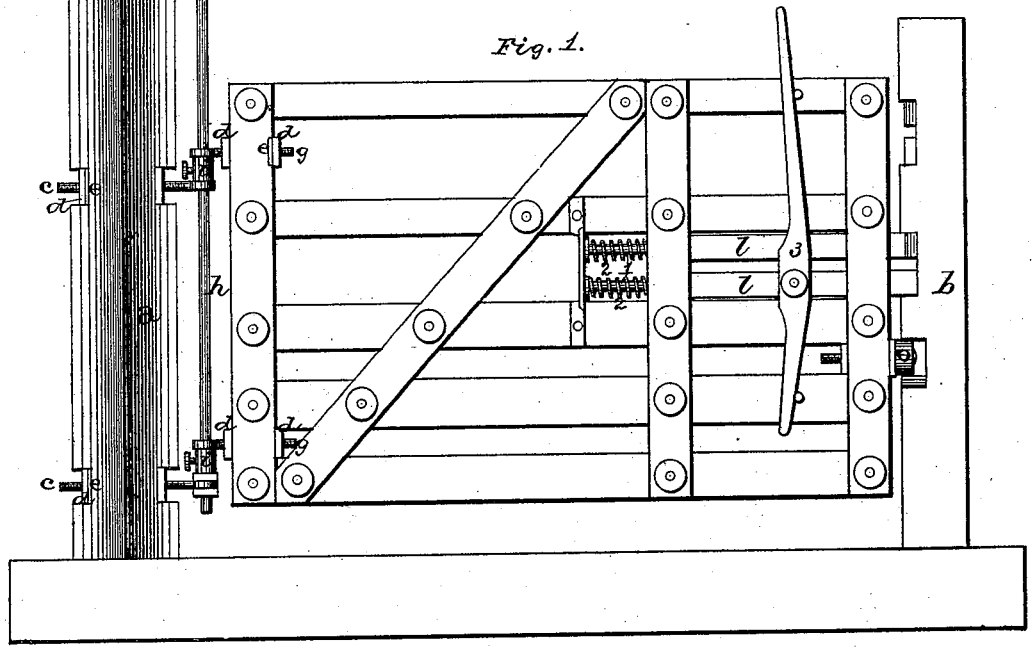
Figure 2:
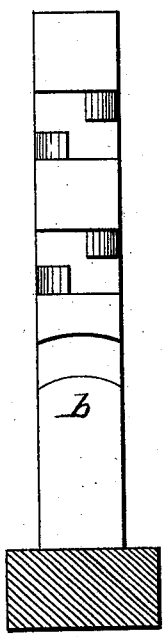

W. G. MENTZER.
Gate.

No. 200,555. Patented Feb. 19, 1878.

WITNESSES:
J. Wm Garner
W. S. O. Haines

INVENTOR:
W. G. Mentzer,
per
F. A. Lehmann,
atty

N. PETERS, PHOTO-LITHOGRAPHER, WASHINGTON, D.C.

UNITED STATES PATENT OFFICE.

WILLIAM G. MENTZER, OF GARRETT, INDIANA, ASSIGNOR OF TWO-THIRDS HIS RIGHT TO JAMES S. SMITH AND HENRY M. JONES.

IMPROVEMENT IN GATES.

Specification forming part of Letters Patent No. 200,555, dated February 19, 1878; application filed November 9, 1877.

*To all whom it may concern:*

Be it known that I, WILLIAM G. MENTZER, of Garrett, in the county of De Kalb and State of Indiana, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in the arrangement and combination of parts, that will be more fully described hereinafter, whereby a cheap, simple, and effective gate is produced.

The accompanying drawings represent my invention.

*a* represents the post to which the gate is hinged, and *b* the post against which the gate closes. The post *a*, instead of being turned squarely toward the gate, is here turned so as to present one edge only. Passing through this post from edge to edge are the screw-bolts *c*, which have eyes upon their inner ends, and which are securely held and clamped in position by means of the nuts and washers *d e*. Passing through the rear end of the gate are similar screw-bolts *g*, which are also clamped rigidly in position by means of the nuts and washers *d e*. Passing through the eyes of the bolts that pass through the post *a* is a vertical rod, *h*, which forms a pivot, upon which the gate opens and closes. Just above the top of each one of the screw-bolts *c*, and under the screw-bolts *g*, are placed the sleeves *i*, which can be adjusted up and down upon the rod *h*, and held in place by means of the set-screws for the purpose of raising and lowering the gate to any desired degree.

When it is desired to lift the gate upward for the purpose of allowing small animals to pass through under, or to raise the gate above the level of snow-drifts, it is only necessary to raise the gate and the sleeves to the desired height, and then tighten the set-screws on the rod *h*, and the gate will be held in that position.

The post *b* is provided with a series of recesses and notches for the latches of the gate to catch in when the gate is raised above the usual level.

The outer end of the gate is provided with a frictional roller, *o*, which catches upon the incline formed in the side of the post *b*, so as to raise the gate upward in a suitable position for the latches of the gate to catch, whether closed from one side or the other.

Instead of employing a single latch upon my gate, I use two, each one of which consists of a rod or bar, *l*, which has a hole made in its inner end for the rod 1 to enter as the latch is forced backward. Upon this rod 1 is placed a coiled spring, 2, which instantly returns the latch to position as soon as it is released. Each one of the latches is provided with an operating-lever, 3, which lever is hinged in its center, so that it can be moved equally well from either end. By having its end project above the top of the gate, parties riding up to the gate on horseback can readily open the gate without dismounting; and by having the lower end extend downward near to the ground, the gate can be readily unlatched by a child.

It will be seen that the latches in the post are so arranged that either latch can be operated, and will unfasten the gate, the latch having its lever on the farther side from the person opening the gate being always used where it is desired to open the gate toward you, and the one nearest to you where it is desired to open the gate from you.

Having thus described my invention, I claim—

The combination of the latches *l*, rods 1, springs 2, levers 3, and notches in the side of the post *b*, whereby either latch for opening the gate can be operated, substantially as described.

In testimony that I claim the foregoing I have hereunto set my hand and seal this 26th day of October, 1877.

WILLIAM G. MENTZER. [L. S.]

Witnesses:
RICHARD L. SIMPSON,
A. L. RIMOEHL.